METAL SILICATE COATING UTILIZING ELECTROSTATIC FIELD

Filed July 30, 1964

INVENTOR
THOMAS E. MYERS

BY Hofgren, Wegner,
Allen, Stellman & McCord
Attys.

United States Patent Office 3,436,257
Patented Apr. 1, 1969

3,436,257

METAL SILICATE COATING UTILIZING ELECTROSTATIC FIELD

Thomas E. Myers, St. Charles, Ill., assignor to Norma J. Vance

Filed July 30, 1964, Ser. No. 386,213
Int. Cl. B44d 1/18
U.S. Cl. 117—213 17 Claims

ABSTRACT OF THE DISCLOSURE

A method and apparatus for applying a conductive coating of a metal silicate on a non-conducting plate, in which a metal salt is sprayed on a heated surface of the plate, in an electrostatic field.

This invention relates to semiconductors having conductive surface layers on nonconductive substrates, and, more particularly, conductive metal silicate layers on nonconductive glass or other silicate substrates, and the formation of such semiconductors and layers.

Conductive layers or coatings can be formed on nonconductive glass surfaces by applying a metal salt, such as tin oxide, to a glass surface and the glass surface is thereafter heated. The metal salt converts first to its oxide and then to its silicate in combining with the glass surface. However, it has been found that the surface layers formed in such a manner are usually of high impedance and of a nonhomogeneous nature. The metal oxide often forms on the glass surface in uneven masses and does not spread evenly or penetrate the surface. Such layers are in loose interconnection with the glass surface and are often easily and accidentally removed. Also, the layer often has an unduly fogged appearance and is unacceptable for such applications as cathode tube coatings and the like.

It is a general object of this invention to provide new and useful structures including semiconductor layers on nonconducting substrates, of the character described.

Another object is to provide a new and useful method for forming semiconductor layers on glass or other silicate surfaces.

Yet another object is to provide such a method wherein the semiconductor layer penertates and is integral with the substrate surface.

Still another object is to provide such a method in which the thickness of the semiconductor layer can conveniently be controlled so that layers of a variety of desired thicknesses may be provided.

Yet another object of this invention is to provide a new and useful method for forming such layers in a manner rendering the layer generally uniform and practically eliminating the presence of fogginess in or on the layer while providing a layer which is not readily chipped or removed from the substrate.

Still another object is to provide a semiconductor and method of making the same in which a low impedance surface is included.

Still another object of this invention is to provide a new and useful apparatus for conducting the present method in accordance with any of the foregoing objects.

An another object of this invention is to provide a new and useful semiconductor material in accordance with the method of any of the foregoing objects.

Other objects of this invention will be apparent from the following description and drawings, in which.

Figures 1, 2, 3, 4:
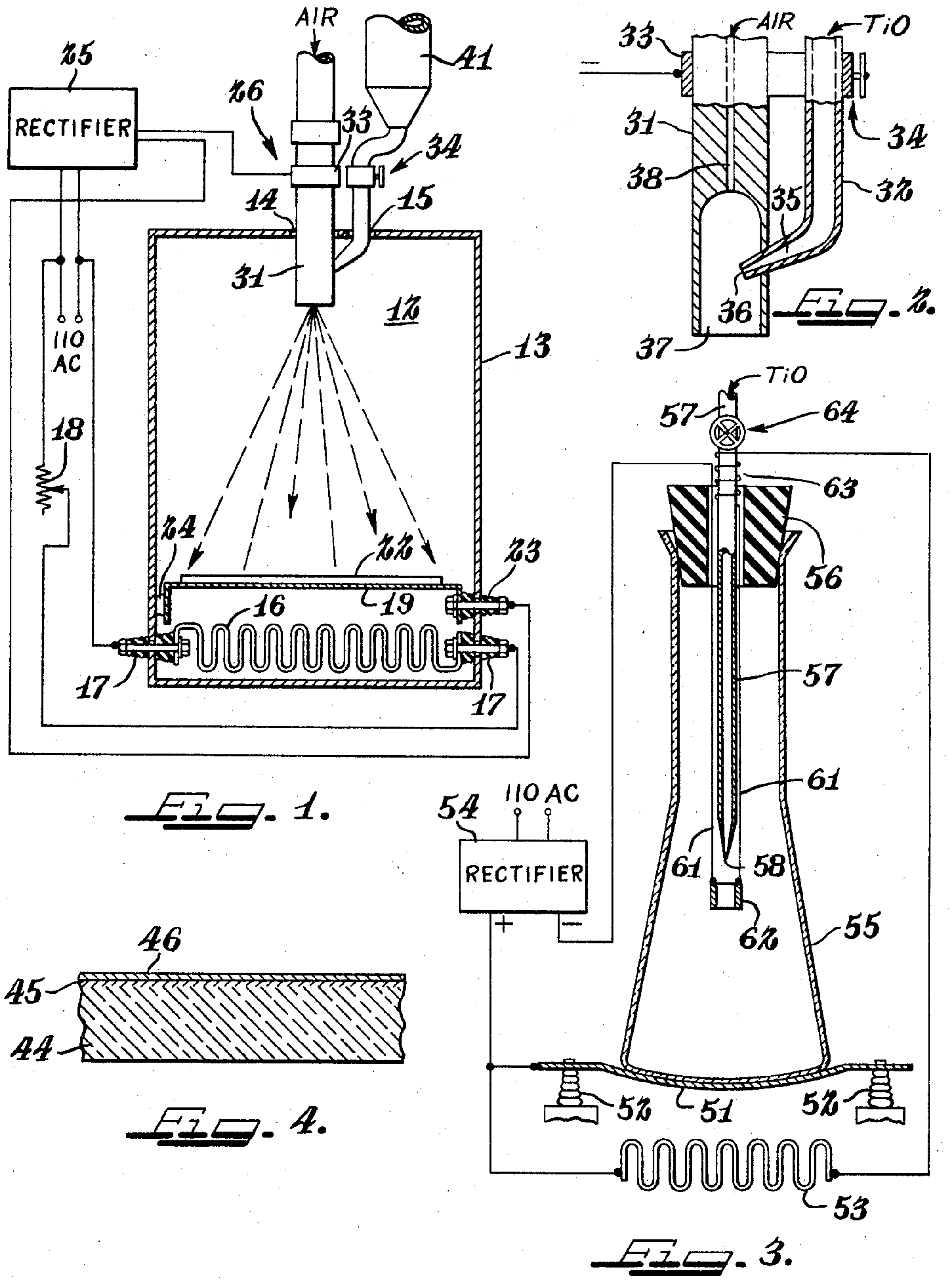
FIGURE 1 is a vertical section through a system of the present invention useful in carrying out the present method for forming the present articles.
FIGURE 2 is a partial vertical section through the nozzle portion of the system of FIGURE 1.
FIGURE 3 is another form of system useful in accordance with the present invention.
FIGURE 4 is a section through a nonconductive substrate having a semiconductor layer and phosphor layer applied thereto in accordance with the present invention.

While this invention is susceptible of embodiment in many different forms, there is shown in the drawings and will herein be described in detail an embodiment of the invention and modification thereof with the understanding that the present disclosure is to be considered as an exemplification of the principles of the invention and is not intended to limit the invention to the embodiment or modification illustrated and/or described.

Turning first to FIGURE 1, a form of coating device is illustrated for use in accordance with the present invention. The coating device includes a vapor spray chamber 12 defined by enclosing walls of shell 13. The top wall of the shell 13 includes a pair of openings or ports 14 and 15. A heating means, in the form of an electrical heating element 16, is provided in the bottom of chamber 12 and is mounted by insulators 17 through shell 13 and supported thereby from shell 13. Heating element 16 is electrically insulated from wall 13 by insulators 17. Insulators 17 are of conventional design for interconnecting lead wires with the heating element 16. The lead wires from the insulators are connected to a power source illustrated in the form of a 110 v. AC source, with one of the lead wires connecting a variable resistance 18 in the circuit for controlling heating element 16 in the usual manner to permit variance in heating temperature.

An electrode in the form of a backing plate 19 is mounted above heating element 16 in heat receiving proximity thereto. Plate 19 is adapted to back a glass work piece as shown at reference numeral 22. The plate 19 is mounted at one point by an insulator 23 through wall 13 and at other portions of the periphery of plate 19 by insulating material 24. The insulating material 24 may advantageously extend about the full periphery of plate 19 to seal the heating element 16 from the portion of chamber 12 above plate 19.

A lead wire to plate 19, connected through insulator 23 in electrical communication with plate 19, is connected at its other end to the positive side of a direct current source such as illustrated by transformer 25. Plate 19 forms the positive electrode in the illustrated device. The negative side of rectifier 25 is connected by a lead wire to a spray nozzle assembly indicated generally at 26. Spray nozzle assembly 26 comprises the other or negative electrode.

Referring now to FIGURES 1 and 2, spray nozzle 26 is of the vaporizing type and includes an electrically conductive air tube 31 and a coating material feed tube 32. An electrically conductive support member 33 supports tube 32 from tube 31, tube 31 being supported from suitable framework (not shown). A valve 34 is provided for adjusting flow through tube 32.

Tube 32 includes a lower tapered end 35 defining an outlet port 36. Outlet port 36 directs fluid from the tapered portion 35 into a lower, widened air pressure chamber 37 in tube 31. Tube 31 also includes a smaller diameter upper conduit portion 38 for supplying pressurizing air to the chamber 37. The liquid directed through conduit 32 into the nozzle outlet chamber 37 is supplied in the illustrated form from a container 41. Air, directed under pressure from a suitable high pressure source (not shown) though conduit 38 into chamber 37, will tend to drive liquid from port 36. The liquid atomizes from the outlet end of nozzle 26 and is driven toward the exposed surface of work piece 22. The amount of liquid can be regulated by regulating the flow through valve 34.

Considering the apparatus of FIGURES 1 and 2 as thus far described, it will be seen that the coating method may be generally conducted as follows: The work piece is backed by the positive electrode or plate 19. The other or negative electrode 31 is spaced from the exposed surface of the work piece, i.e. the surface to be treated. The work piece is heated by the heating element 16 to the temperature at which the silicate of the work piece is converted to silicate oxide. This temperature is sufficient to increase the porosity of the exposed surface of work piece 22 and to increase its receptivity to the coating material.

A unidirectional electrostatic field is established between the electrodes, i.e. plate 19 and nozzle 26. A metal salt, in solution or dispersion in a vaporizable liquid, preferably in solution, is introduced from containers 41 through conduit 32 into the nozzle outlet chamber 37 while air under pressure, e.g. 60 p.s.i., is forced through conduit 38 into chamber 37. The metal salt solution or dispersion is atomized as it leaves nozzle port 36. The valve 34 may be adjusted as desired or needed to regulate flow to provide a good dense cloud of particles, preferably very fine particles in the absence of liquid droplets. The atomized particles enter the vapor chamber 12 and are contained against the exposed face of work piece 22. The spraying is continued until the desired layer thickness of the coating material is formed.

The flow of air and liquid is stopped, and the work piece 22 is permitted to cool sufficiently to prevent breakage or the like by sudden exposure to ambient conditions and is thereupon removed through an access door (not shown) or the like, in shell 13. The work piece, as a result of the above described treatment, is provided with a homogeneous uniform layer of the silicate of the metal corresponding to the metal salt included in the solution or dispersion introduced from chamber 41.

If desired, the work piece may be retained within vapor chamber 12, and, prior to cooling, a phosphor material in solution or dispersion may be introduced from chamber 41, or a similar chamber interchangeable therewith, in the same manner as described for the metal salt, with the phosphor being vaporized to provide a vapor within chamber 12. A phosphor layer may thereby be laid down over the conductive metal silicate layer formed on the exposed surface of work piece 22. The phosphor layer may be provided in a variety of desired thicknesses by merely discontinuing flow of phosphor through conduit 32 after the desired thickness has been obtained. Heating and the unidirectional electrostatic field are maintained as above.

Although I do not intend to be held to any theories regarding the operation of the present method and device in forming the semiconductor layers in accordance herewith, it is believed that upon heating the glass or other surface to the temperature at which the oxide of the silicate forms at the surface, the glass molecules are expanded so that the surface is increased in porosity and becomes much more highly receptive to penetration by metal salt particles in very fine form. The metal salt is introduced at the negative electrode and is carried by vaporizing particles and acquires a negative charge at the electrode. As the vapors come close to the surface or impinge the surface of the work piece, the positively charged plate 19 greatly increases the particle speed toward and into the surface of the work piece to penetrate the work piece to a greater depth. The work piece is a part of the dielectric between the two electrodes, thus providing charged particle migration to a depth not otherwise obtainable.

Because the particles are given a negative charge before they come into close association with the surface 22, the particles tend to repel each other to maintain fairly even spacing in the vapor. This and the fact that a very fine vapor is provided results in impingement or deposition of the vapors on the work piece surface in uniform homogeneous distribution, and in the form of discrete, small particles rather than in the form of lumps or uneven coats as may otherwise occur. Thus, when the positive charge on plate 19 accelerates the particles into the glass, they are accelerated from a generally homogeneous, finely dispersed pattern and are pulled into the glass in such a pattern.

The thickness of the coating in terms of its depth of penetration may conveniently be regulated by regulating the intensity of the electrostatic field, a more intense electrostatic field pulling more of the particles deeper into the glass, and by the amount of metal salt present, i.e. the amount and/or concentration of the metal salt solution or dispersion used, more salt giving thicker coatings. The thickness of coating may also be regulated, of course, by the length of time of treatment of the surface with the vapors, longer treating times giving thicker coatings although short processing times of a few minutes or less are preferred to assure obtaining a fine vapor. Also, the thickness or depth of penetration may be regulated to some extent by the temperature provided at the work piece surface, e.g. by regulation of the variable resistance 18. Thicker coatings, of course, are of lower resistance than thinner coatings and resistance of the semiconductor can be controlled by controlling coating thicknesses in a inverse direction of variance.

Relating to the effect of temperature regulation, the glass or other silicate surface, upon heating, reaches the temperature range where it begins to become more highly receptive to the metal salt, and further increase in temperature makes the surface receptive to a greater depth. Increased susceptibility begins significantly below the surface softening point, e.g. 50° F. below or more, and continues through the softening point. However, temperatures sufficient to distort the surface are preferably not used. The regulation of temperature for desired depth with a particular silicate material work piece can be readily determined by simple experimentation. Temperatures substantally below the softening range are preferred for high resistance coatings, e.g. 3,000 ohms/cm. or higher, while temperatures into the softening range are preferred for thicker coatings of lower resistance, e.g. 1–5 ohms/cm. or lower. Intermediate conditions, of course, can be used for intermediate coating resistances.

With respect to the metal salt contained within the vapor, the salt will often be referred to herein as an oxide of the metal. However, as will become evident, other salts may be used, e.g. chlorides of metals. As, or soon after, the metal salt hits the surface of the work piece, the oxide of the metal is formed if the salt was not originally an oxide, due to the heat at the surface and the ability of the silicate to cause such conversion, the silicate being in the silicate oxide form. As the metal oxide is pulled or progresses deeper into the work piece, it readily unites wtih the work piece silicate to provide the corresponding metal silicate. It is believed that the salt of any metal may be used in forming surface layers in accordance herewith, although, as will be seen below, salts of certain metals are preferred.

Turning now to FIGURE 4, there is illustrated schematically a section through a work piece coated as described above. The silicate work piece is illustrated in the form of a semiconductor including a substrate of glass 44 having an integral metal silicate conductive layer 45 deposited thereon and penetrating to a surface depth of approximately 15 mils. A layer of phosphor 46 has been laid over the metal silicate layer 45 and is uniform and integral with the surface of layer 45.

Turing now to FIGURE 3, a form of coating system is illustrated which is particularly advantageous for use in coating the interior surfaces of cathode ray tubes and the like. The device of FIGURE 3 includes a positive electrode in the form of a plate 51 having a depression conforming with the outer surface of a glass cathode ray tube shell 55 for supporting and backing shell 55 at the facial surface of shell 55. Plate 51 is supported from a suitable support surface by insulators 42 and is electrically connected by suitable leads to the positive side of rectifier 54, supplied from a 110 v. AC source. A heating element 53 is disposed in heating proximity to plate 51. The glass shell 55 is provided with a stopper 56 for defining a vapor chamber within shell 55. A conduit or tube 57 is supported through a bore in stopper 56 and includes a tapered nozzle and having an outlet 58 disposed in a downward direction toward the inner surface of the cathode ray tube face. A pair of stiff leads 61 support an electrode 62 of annular or ring-like configuration. The nozzle outlet 58 is directed generally through the center of the ring-like electrode 62. A heating element, shown schematically at 63, is provided for heating tube 57, and a control valve 64 is provided for controlling flow of liquid through tube 57. Heating element 63 may surround tube 57 or be positioned in close heating proximity to tube 57. Suitable electric circuitry is provided for applying a negative charge to electrode 62 and for applying electric energy to the heating elements 53 and 63. The solution or dispersion of metal salt is introduced through tube 57, is controlled by valve 64, and is emitted as a vapor through outlet 58. Air pressure, e.g. 60 p.s.i., is maintained behind the liquid to drive it through outlet 58.

The use of the system described in FIGURE 3 will be apparent from the descriptions given above. Briefly, the heating element 53 is used to heat the interior glass surface of the facial portion of cathode ray tube shell 55 to the temperature at which the oxide of the silicate forms. The air and salt solution mixture is introduced through tube 57 and heating element 63 heats the tube 57 to aid in vaporizing the metal salt solution at the nozzle. Flow through tube 57 is controlled by valve 64 to give the desired vapor density wthin the cathode ray tube shell 55. Rectifier 54 is supplying energy for the heating coils 53 and 63 and the electrostatic field has already been established between electrode 62 and electrode 51; the semiconductor layer formation proceeds as described above.

In an advantageous form of the invention, liquid carrier for the metal salt vaporizes at a temperature substantially below the temperature of the work piece surface. This is advantageous in aiding in the formation over more uniform and tightly adhering layers of semi-conductor material on the nonconductive substrate for the work piece.

In developing and experimenting with the present system, various runs were made. Some of these runs are reported hereinbelow as examples. Each run was conducted in a system as illustrated in FIGURES 1 and 2 with air charged to the air nozzle at about 60 p.s.i. About 50 ml. of the salt solution was introduced into chamber 41 and flow was controlled by the valve 34 to provide and maintain a heavy fine mist within the chamber 12.

Example 1

A purchased solution of 20% aqueous titanium tetrachloride was introduced into the container 41. A lime glass plate, about ¼" x 4½" x 5", was placed on the positive electrode 19. The current was turned on to establish an electrostatic field of 50 kv. and the heater control was adjusted to provide a surface heat for the work piece of about 700–720° F. The valve 34 was opened and adjusted to provide a vapor mist within chamber 12, and the air flow and solution flow were continued until about 10 ml. of solution had been used, i.e. for a period of slightly less than one minute. The electric power was then disconnected, and the glass plate was permitted to cool for about ½ hour and was then removed from chamber 12. The glass plate was scratched to a depth of 12–13 mils without completely penetrating the titanium silicate surface layer. The surface layer was homogeneous, clear and colorless and did not readily chip from the substrate. The resistance of the conductive layer was about 5 ohms/cm.

Example 2

The procedure of Example 1 was repeated using 8–10 ml. of a solution of 2 parts by weight of indium trichloride in solution in 1 part by weight aqueous KCN solution. The glass work piece was lead glass (softening at 380–390° F.) and the work piece was heated at about 340–350° F. during treating and the electrostatic field was about 8,000 volts. The resulting semiconductor layer on the glass work piece can be scratched to a depth of 1 mil without completely penetrating the indium silicate surface layer. The surface layer was homogeneous, clear and colorless and did not readily chip from the substrate. The resistance of the conductive layer was about 2,000 to 3,000 ohms/cm.

Example 3

The procedure of Example 1 was repeated using about 10 ml. of a prepared solution of indium oxide in aqueous acid as the salt and using soda glass on the work piece. The treating was carried out at about 370–390° F. in an electrostatic field of about 20 kv. The resulting semi-conductor layer on the glass work piece can be scratched to a depth of 10 mils or more without completely penetrating the indium silicate surface layer.

Additional examples were run using indium tin oxide, indium nitrate, i.e. $In(NO_3)_3.3H_2O$, and indium selenate, i.e. $In_2(SeO_4)_3.10H_2O$, respectively in lieu of the titanium tetrachloride of Example 1 with similar results. Also, ethanol was substituted for water in some of the runs and similar results were obtained. The electrostatic field was varied between 8 and 50 kv. for many runs, higher voltages resulting in somewhat deeper penetration and lower resistance.

Example 4

The procedure of Example 1 was repeated using 8–10 ml. of a solution of 5 parts by weight of stannous chloride in 1 part by weight of water during a spray time of less than a minute. Pyrex was used as the work piece and the temperature was held at 900–950° F. The resulting semiconductor layer on the glas work piece was scratched to a depth of about 12–13 mils without completely penetrating the stannous silicate surface. The surface layer was homogeneous, clear and colorless and did not readily chip from the substrate. The resistance of the conductive layer was about 3 ohms/cm.

Example 5

The procedure of Example 1 was repeated using a solution of 2 parts by weight of stannous iodide in 1 part by weight of water. The resulting semiconductor layer on the glass work piece had a bluish amber color. Surface scratching tests showed that the stannous silicate surface penetrated beyond a few mils into the surface.

Example 6

The procedure of Example 1 was repeated using about 8 ml. of a solution of 2 parts by weight of cadmium bromide in 1 part by weight of water. Depth of penetration and resistance properties of the cadmium silicate surface layer were similar to Example 1.

Based on the runs made, the preferred metals are tin, indium, cadmium and titanium, since in each case an excellent uniform, homogeneous, transparent layer was usually formed. Additional runs were made with iron oxide and cobalt oxide, resulting in the preparation of colored coatings. These and other salts may be used wherever colored coatings may be desired or tolerated. Most of the conductive layers formed in the experiments were at least 10 to 20 mils thick or deep although other thicknesses, e.g. 1 to 20 mils or more or less, can be formed with proper regulation of the method as described hereinabove. The coefficient of expansion of each layer was about the same as that of the glass substrate.

More generally with respect to the method herein, any field density sufficient to cause migration of the metal oxide into the glass surface may be used. I have found that a field density resulting from a potential of 8,000 v. to 60,000 v. is usually adequate. Higher potentials are useful where deeper penetration may be desired, and lower potentials may be useful with smaller work pieces. In any event, the potential should be maintained high enough to effect penetration of the work piece surface by the charged metal salt particles, but below the point where arcing occurs between the electrodes.

Although particular metal salts have been mentioned hereinabove, the metal is not critical. However, where it is desired to prepare a semiconductor, the silicate salt of the metal selected should be electrically conductive. Examples of salts which may be useful are the bromates, bromides, chlorates, iodides, fluorides, nitrates, selenates, sulfates, oxides, etc., including hydrates thereof, of such metals as indium, titanium, tin, cadmium, iron, cobalt, or any other metal of which the silicate is electrically conductive.

The liquids used for carrying the metal salts are liquids which exist in vapor phase at the silicate surface temperature. Preferably, for ease of handling and ease of delivery to the vapor chamber, the liquid is a solvent for the salt used. Water and alcohols are useful and such solvents as acetone, other ketones, hydrocarbons and the like may be used, but where such more highly flammable solvents introduce hazards under the operation conditions, they should be avoided. Suitable volatile solvents for a particular metal salt will be evident to those in the art or will be recognized by reference to suitable texts such as a Handbook of Chemistry. The salts are often supplied by the manufacturer or supplier in suitable volatile solvents and may generally be used as supplied. Any concentration of salts in the solvents can be used, e.g. 1 to 5 parts by weight per part by weight solvent or more or less. The total amount of salt used will cause variances in coating penetration and resistance with deeper penetration and lower resistance generally resulting from increased amounts of salt. The amount of salt can be increased by increasing the amount of solution or dispersion used and/or increasing the concentration of salt in the solution or dispersion.

Although glass surfaces are specifically mentioned above, it is to be understood that there are a wide variety of glass compositions available, and since each such composition is a silicate it is useful herein. Also, in actual experiments, I have found that other silicates such as ceramics, porcelain and steatite may be used. Additional silicates which may be useful are terra cotta and mica. Examples of specific glasses are lead glass, soda glass, pyrex, Nonax, uranium glass and the like. The composition of the silicate work piece will determine the temperature of the processing, the work piece temperature being at the temperature where the surface silicate is transformed to the silicate oxide and is more highly receptive to the metal salt. I have found temperatures in the range of 220° C. to 850° C. usually adequate.

In accordance herewith, there has been provided a method for producing semi-conductor layers on silicate surfaces such as glass surfaces. The layer thickness can be controlled by varying the electrostatic pressure in terms of field density per unit area, the temperature and processing time, to provide a variety of thicknesses, e.g. in the range of 1–20 mils or more or less, e.g. up to 50 mils or thicker and to provide layers having very low resistance values of less than 1 ohm, e.g. 0.1 ohm/cm. in view of the uniformity of the layer and the layer thicknesses available. The coated silicates provided in accordance herewith include the surface conductive layer integral with the substrate or subsurface nonconductive layer, and undue fogging in the surface layer is eliminated. Additionally, the layer has the same coefficient of expansion as the glass substrate and will not easily flake, chip or fracture from the substrate.

I claim:

1. In a method for making a semiconductor comprising a silicate surface impregnated with normally solid conductive metal silicate, the improvement which comprises maintaining a substantial electrical potential difference with respect to said surface, to create a unidirectional electrostatic field, heating said surface and applying on said heated surface an inorganic salt of the metal of said conductive metal silicate and an amount of atomized liquid suffiicent to fluidize and carry said normally solid conductive material, said heating being to a temperature sufficient to increase the porosity of said silicate surface and render said silicate surface receptive to penetration by particulate conductive metal silicate, and said liquid boiling at a temperature substantially below the heated surface temperature.

2. The method of claim 1 including: containing said atomized liquid against said surface.

3. A method for treating a glass surface with normally solid electrically conductive metal silicate, which method comprises backing said silicate surface with a positive electrode and facing said surface with a negative electrode, applying a difference in potential of about 10 to 60 kv. between said electrodes sufficient to establish an electrostatic field between said negative and positive electrodes, heating said glass surface to a temperature in the range of 220 to 850° C. and applying particulate metal oxide to said heated surface from atomized liquid having particles negatively charged by said negative electrode until a desired coating thickness of metal silicate is obtained.

4. A method for treating a silicate surface with a desired thickness normally solid conductive silicate of a metal, which method comprises heating said surface sufficient to oxide surface silicate, and applying on said heated surface the oxide of said metal and an amount of atomized liquid sufficient to fluidize and carry said metal oxide while maintaining a substantial electrical potential difference from one side of said surface to the other sufficient to create an electrostatic field of a severity carrying metal silicate formed from said metal oxide to the depth of the desired coating thickness.

5. The method of claim 7 wherein said heating is to a temperature of about the softening point of said surface and below the distortion temperature thereof.

6. The method of claim 5 wherein said heating is to a temperature sufficiently below the softening point of said surface for formation of a thin resistance coating.

7. The method of claim 4 wherein said liquid is water.

8. The method of claim 4 wherein said metal oxide is formed by heat conversion of a salt of the metal in the presence of air and said salt is soluble in the liquid state of said atomized liquid.

9. A method of coating a glass surface of a glass platen with an integral layer of electrically conductive inorganic titanium silicate, which method comprises subjecting said glass surface to the influence of a direct current electrostatic field passing therethrough with the positive potential backing said surface while heating said surface at a temperature in the range of 220 to 850° C. sufficient to form silicate oxide of said glass on said surface, and treating said surface with titanium oxide from negatively charged particles of a atomized aqueous liquid in an amount sufficient to form thereon an electrically conductive coating of titanium silicate having a thickness of at least 10 to 20 mils.

10. A method of coating a glass surface of a glass platen with an integral layer of electrically conductive inorganic indium silicate which method comprises subjecting said glass surface to the influence of a direct current electrostatic field passing therethrough with the positive potential backing said surface, heating said surface to a temperature in the range of 220 to 850° C. sufficient to form silicate oxide of said glass on said surface, and treating said surface with indium oxide from negatively charged particles of a atomized aqueous liquid in an amount sufficient to form thereon an electrically conductive coating of indium silicate having a thickness of at least 10 to 20 mils.

11. A method of coating a glass surface of a glass blaten with an integral layer of electrically conductive inorganic tin silicate, which method comprises subjecting said glass surface to the influence of a direct current electrostatic field passing therethrough with the positive potential backing said surface, heating said surface to a temperature in the range of 220 to 850° C. sufficient to form silicate oxide of said glass on said surface, and treating said surface with tin oxide from negatively charged particles of a atomized aqueous liquid in an amount sufficient to form thereon an electrically conductive coating of tin silicate having a thickness of at least 10 to 20 mils.

12. A method of coating a glass surface of a glass platen with an integral layer of electrically conductive inorganic cadmium silicate, which method comprises subjecting said glass surface to the influence of a direct current electrostatic field passing therethrough with the positive potential backing said surface, heating said surface to a temperature in the range of 220 to 850° C. sufficient to form silicate oxide of said glass on said surface, and treating said surface with a vaporized solution of water soluble inorganic cadmium oxide from negatively charged particles of a atomized aqueous liquid in an amount sufficient to form thereon an electrically conductive coating of cadmium silicate having a thickness of at least 10 to 20 mils.

13. A method of coating a silicate surface of a glass, ceramic, porcelain or steatite platen with an integral electrically conductive layer, which method comprises subjecting said silicate surface to the influence of an electrostatic field passing therethrough, said electrostatic field being established by a direct current potential in the range of 10 to 60 kv., with the negative potential facing said surface and the positive potential backing said surface, heating said surface to a temperature in the range of 220 to 850° C. sufficient to form silicate oxide on said surface, and treating said surface with a metal oxide in which the metal is selected from the class consisting of titanium, indium, tin and cadmium from negatively charged atomized aqueous liquid, in an amount sufficient to form on said surface an electrically conductive layer having a thickness of at least 1 to 20 mils.

14. The method of claim 16 including the additional step of spraying the resulting coated surface with a phosphor while subjecting said surface to said influence of said electrostatic field in an amount of phosphor sufficient to provide a layer of phosphor over the first mentioned layer.

15. A method of forming an integral electrically conductive layer on a glass surface of a glass platen, which method comprises treating said surface with HF and washing residual HF therefrom, subjecting said surface to the influence of a direct current electrostatic field passing therethrough with the positive potential backing said surface, heating said surface to a temperature in the range of 220 to 850° C. sufficient to form a silicate oxide of said glass on said surface, spraying said surface with an aqueous solution of titanium tetrachloride in an amount sufficient to deposit thereon an electrically conductive coating of inorganic salt having a thickness of 1 to 10 mils, and thereafter, with the resulting layer under the influence of a direct current electrostatic field passing therethrough with the positive potential backing the surface of said layer, depositing a layer of phosphor over said first mentioned layer.

16. A method of forming an integral electrically conductive layer on a glass surface of a glass platen, which method comprises treating said surface with HF and washing residual HF therefrom, subjecting said surface to the influence of a direct current electrostatic field passing therethrough with the positive potential backing said surface, heating said surface to a temperature in the range of 220 to 850° C. sufficient to form a silicate oxide of said glass on said surface, spraying said surface with an aqueous solution of indium oxide in an amount sufficient to deposit thereon an electrically conductive coating of inorganic salt having a thickness of 1 to 10 mils, and thereafter, with the resulting layer under the influence of a direct current electrostatic field passing therethrough with the positive potential backing the surface of said layer, depositing a layer of phosphor over said first mentioned layer.

17. A method of coating a silicate surface of a platen with an integral electrically conductive metal silicate layer, which method comprises backing said platen with a first electrode positioned subjacent the platen with the surface desired to be coated generally facing upward and facing a second electrode, heating said surface to a temperature in the range of 220 to 850° C., applying a direct current across said electrodes with the first electrode having the positive charge, said direcct current being sufficient to create an electrostatic field through said platen, spraying an aqueous inorganic salt solution or dispersion from adjacent said second electrode onto said surface, and confining the spray against said surface.

References Cited

UNITED STATES PATENTS

| | | | |
|---|---|---|---|
| 2,779,690 | 1/1957 | Gaiser. | |
| 2,878,137 | 3/1959 | Butler et al. | |
| 2,919,212 | 12/1959 | Gaiser | 117—229 |
| 2,968,578 | 1/1961 | Mochel | 117—54 |
| 2,971,867 | 2/1961 | Lytle | 117—229 X |
| 2,988,458 | 6/1961 | Meister et al. | 117—93.43 |
| 3,004,875 | 10/1961 | Lytle. | |
| 3,019,136 | 1/1962 | Auffenorde et al. | 117—229 X |
| 3,130,066 | 4/1964 | Brady | 117—93.43 |

ALFRED L. LEVITT, *Primary Examiner.*

A. GOLIAN, *Assistant Examiner.*

U.S. Cl. X.R.

117—17, 33.5, 93.4, 118, 124, 215, 221, 229